Aug. 20, 1929.  E. BLAU  1,725,331
SURFACE PLATE FOR WHEEL LATHES
Original Filed Feb. 28, 1928
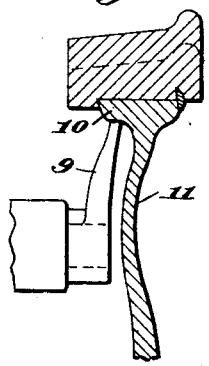
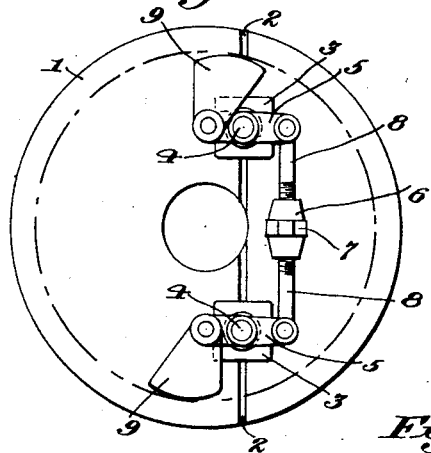
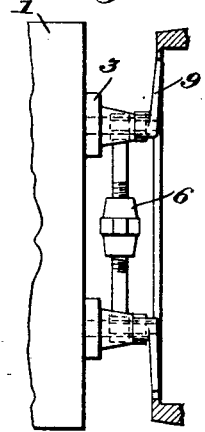
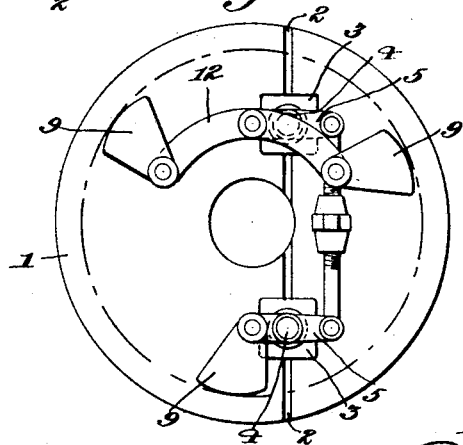
Inventor:
Ernst Blau,
Att'y.

Patented Aug. 20, 1929.

1,725,331

UNITED STATES PATENT OFFICE.

ERNST BLAU, OF BERLIN, GERMANY.

SURFACE PLATE FOR WHEEL LATHES.

Original application filed February 28, 1928, Serial No. 257,742, and in Germany November 26, 1925. Divided and this application filed April 12, 1929. Serial No. 354,610.

The present invention relates to surface plates for wheel lathes and particularly to lathes of the type in which jaws are provided for engaging the tire or rim of a driven wheel on the inside, as differentiated from lathes of the type provided with drivers for engaging the spokes of the wheel or holes in the wheel center. This application is a division of my application Serial No. 257,742 for "Surface plates for wheel lathes" which was filed on February 28, 1928.

One of the objects of the invention is the provision of means for equalizing the pressure which the jaws exert on the tire or the rim, as the case may be, and for this purpose I provide the usual surface plate with a movable support upon which the jaws are movably carried, the support acting to effect uniform distribution of pressure on all of the jaws when the reaction of the cutting tool causes one of the jaws to exert an increase of pressure against the work.

It has previously been proposed to provide jaws for engaging the outer end faces of the tires of the driven wheels but this involves the drawback that unequal axial pressure of the jaws is apt to deform or otherwise unduly strain the wheels and axles. In this connection, jaws for engaging the inner periphery of a tire have been pivoted directly on the face plate without being provided with means for effecting uniform pressure distribution. Such jaws often cause the tires to become loose on the rims for if one jaw exerts a pressure appreciably greater than that of the remaining jaws upon the tire or rim, dangerous deformation of the tire may result. This is particularly true when the tire has been worn to the extent that its cross-section is below normal size.

Equalization of the pressure upon the driving jaws has previously been attempted by providing two pivotally mounted jaws with lever arms pivotally attached to a common connecting rod. The purpose of this construction was to cause movement of an unengaged jaw into working engagement, upon movement of a work engaged jaw. This expedient fails because of practical difficulties, however, for in the case of but a slight irregularity in the inner periphery of the wheel or in the mounting of the jaws upon the surface plate, one jaw may well jam completely between its pivot and the work while the other jaw is entirely out of engagement.

These difficulties are overcome in my invention, by the provision of a movable support for the jaws, the jaws thereby being in "floating" relation with respect to each other and the tire.

These and other objects of the invention will become more readily apparent upon a study of the following specification when read in connection with the accompanying drawings and appended claims.

In the drawing, Fig. 1 is a section of a part of a wheel center showing one jaw engaged with the rim.

Figs. 2 and 3 are a front and an end elevation, respectively, of a modification of my invention in which two jaws are used.

Figure 4 is a front elevation of a further modification in which three jaws are used.

1 is the surface plate of a wheel lathe, not shown, and 2 is a groove or slot provided on the face of the plate 1 for the reception of blocks 3, the blocks 3 being fixed during the rotation of the surface plate but adjustably secured thereto so as to be capable of change of position for various sizes of work. Mounted on each of the blocks 3 are pivots 4 which support double armed levers 5. Corresponding ends of the double armed levers 5 are pivotally connected to an adjustable link 6 which comprises a threaded sleeve 7 engaging the oppositely threaded ends of rods 8.

In Fig. 2, eccentric jaws 9 are pivoted to each of the double armed levers 5 for engagement with the rim 10 of a wheel 11 as shown in Fig. 1. When one of the jaws is caused to exert an increase in pressure because of the engagement of the tool with the work, that jaw will have a tendency to move toward the center of rotation and the other jaw will have a tendency to move away from the center of rotation due to the action of levers 5 and link 6. Thus the reactions between each jaw and the work must always be equal and a condition in which unequal pressures are exerted by the jaws cannot exist.

In Fig. 4, a double armed lever 12 is fulcrumed to an end of one of the double armed levers 5. Eccentric work driving jaws are pivotally connected to the ends of the lever 12 and this modification also provides a construction wherein the pressure upon all of the jaws must be equal in order to have the supporting means in equilibrium.

Having thus described my invention, what I now claim as new and desire to secure by Letters Patent of the United States is as follows:

1. A surface plate for wheel lathes, a pair of double armed levers fulcrumed thereto, a link pivotally connected to each of said levers, and eccentric jaws pivotally carried by said levers, said link and said jaw connections being on opposite sides of the fulcrum.

2. A surface plate for wheel lathes, a pair of blocks mounted thereon, double armed levers fulcrumed on said blocks, a link pivotally connected to each of said levers, and eccentric jaws pivotally carried by said levers, said link and said jaw connections being on opposite sides of the fulcrum.

3. A surface plate for wheel lathes, a pair of blocks adjustably mounted on said surface plate, double armed levers fulcrumed on said blocks, eccentric jaws carried by said levers, and a link connecting said levers, said link being adjustable in length, said link and said jaw connections being on opposite sides of the fulcrum.

4. A surface plate for wheel lathes provided with a slot extending transversely across its face, a pair of blocks mounted in said slot and adjustably secured to said face plate, double armed levers fulcrumed on said blocks, eccentric jaws carried by said levers, and a link pivotally connected to each of said levers, said link being adjustable as to length, said link and said jaw connections being on opposite sides of the fulcrum.

5. A surface plate for wheel lathes, a pair of double armed levers fulcrumed thereto, a link pivotally connected to each of said levers, and eccentric jaws pivotally carried by said levers, said jaws being carried by said levers at points substantially diametrically opposed with respect to the center of rotation of the surface plate, said link and said jaw connections being on opposite sides of the fulcrum.

6. A surface plate for wheel lathes, a pair of double armed levers fulcrumed thereto, a link pivotally connected to each of said levers, a third double armed lever pivotally carried by one of the aforesaid levers at a point opposite the fulcrum with respect to the link connection, eccentric driving jaws pivotally carried thereby, and an eccentric jaw carried by the other of the first mentioned double armed levers, at a point opposite the fulcrum with respect to the link connection.

7. A surface plate for wheel lathes, a pair of blocks adjustably secured thereto, a double armed lever fulcrumed on each block a third double armed lever pivotally carried by one of the aforesaid fulcrumed levers, an eccentric jaw pivotally carried at each end of the aforesaid pivotally carried lever, an eccentric jaw pivotally carried by the other fulcrumed lever, and a link pivotally connected to each of said fulcrumed levers, said link being adjustable in length, said link connections being on opposite sides of the fulcrums with respect to the connections with the said third double armed lever and the jaw carried by the said other fulcrumed lever.

In testimony whereof, I have hereunto set my signature.

ERNST BLAU.